United States Patent
Chen et al.

(10) Patent No.: US 8,159,842 B2
(45) Date of Patent: Apr. 17, 2012

(54) POWER CONVERTER

(75) Inventors: Fu-Sung Chen, Taipei Hsien (TW);
Sen-Chi Lin, Taipei Hsien (TW);
Ming-Ho Huang, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 528 days.

(21) Appl. No.: 12/354,869

(22) Filed: Jan. 16, 2009

(65) Prior Publication Data
US 2010/0182811 A1   Jul. 22, 2010

(51) Int. Cl.
*H02M 1/00* (2007.01)
*H02M 5/42* (2006.01)
(52) U.S. Cl. ................. 363/49; 363/44; 363/84
(58) Field of Classification Search .............. 363/44, 363/49, 81, 84; 323/299
See application file for complete search history.

(56) References Cited

U.S. PATENT DOCUMENTS

| 5,930,121 A * | 7/1999 | Henry .................... 363/16 |
| 6,232,964 B1 * | 5/2001 | Lee ....................... 345/212 |
| 6,906,934 B2 * | 6/2005 | Yang et al. ............. 363/49 |
| 2007/0057936 A1 * | 3/2007 | Lee et al. ............... 345/211 |

* cited by examiner

*Primary Examiner* — Jessica Han
(74) *Attorney, Agent, or Firm* — Muncy, Geissler, Olds & Lowe, PLLC

(57) ABSTRACT

The present invention discloses a power converter with extremely low standby power consumption for converting an input AC power to an output DC power, comprising: a DC supply voltage generating unit, used for generating a DC supply voltage; a pulse width modulation controller, used for generating a pulse width modulation signal according to a feedback voltage of the output DC power; and an isolated actuating switch, placed between the DC supply voltage generating unit and the pulse width modulation controller, for controlling the supply of the DC supply voltage to the pulse width modulation controller, according to a switch signal from a loading device.

11 Claims, 2 Drawing Sheets

POWER CONVERTER

BACKGROUND OF THE INVENTION

1. Field of the Invention

The present invention relates to an AC-to-DC power converter, especially to an AC-to-DC power converter with low standby power consumption when in light load or empty load, used to comply with the green or power saving demand.

2. Description of the Related Art

To reduce the power consumption of an AC-to-DC power converter when in light load or empty load, a conventionally adopted solution is to place an additional switch device, such as a relay or a MOSFET transistor, at the entrance of an AC power to provide a mechanism for disconnecting the AC power and therefore comply with a standby demand. However, there are some drawbacks in placing the additional switch device at the entrance of an AC power. First, it may increase the production cost. Second, it may decrease the efficiency of the power conversion. Third, it may cause challenge to the heat dissipation. These drawbacks may deteriorate the performance of the AC-to-DC power converter, and cause vendors of the AC-to-DC power converter to suffer a higher operation expense. Therefore, there is a need to implement a cost effective AC-to-DC power converter with low standby power consumption when in light load or empty load, without deteriorating the efficiency of power conversion or heat dissipation.

To overcome the drawbacks of the conventionally adopted solution for implementing an AC-to-DC power converter with a standby demand, the present invention proposes a novel solution for the standby demand of an AC-to-DC power converter, needless of placing an additional switch device at the entrance of an AC power to disconnect the AC power.

The power converter of the present invention is designed to have a normal conversion mode and a freeze mode. The power converter of the present invention can be enabled to operate in the normal conversion mode, or disabled to operate in the freeze mode to comply with the standby demand of consuming extremely low power, when the loading condition is light load or empty load.

SUMMARY OF THE INVENTION

One objective of the present invention is to provide an AC-to-DC power converter with extremely low standby power consumption, needless of placing an additional switch device at the entrance of an AC power to shutdown the power conversion.

Another objective of the present invention is to provide an AC-to-DC power converter with extremely low standby power consumption, in which a pulse width modulation (PWM) controller can be enabled to operate in the normal conversion mode or disabled to operate in the freeze mode to comply with the standby demand of low power consumption.

To accomplish the foregoing objectives of the present invention, a power converter with extremely low standby power consumption for converting an input AC power to an output DC power is proposed, the power converter comprising: a DC supply voltage generating unit, used to generate a DC supply voltage; a pulse width modulation controller with a $V_{CC}$ contact pin, used to generate a pulse width modulation signal according to a feedback voltage of the output DC power, when the $V_{CC}$ contact pin is supplied with the DC supply voltage; and an isolated actuating switch, placed between the DC supply voltage generating unit and the pulse width modulation controller, for controlling the connection between the $V_{CC}$ contact pin and the DC supply voltage from the DC supply voltage generating unit, according to a switch signal from a loading device.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

Figure 1:
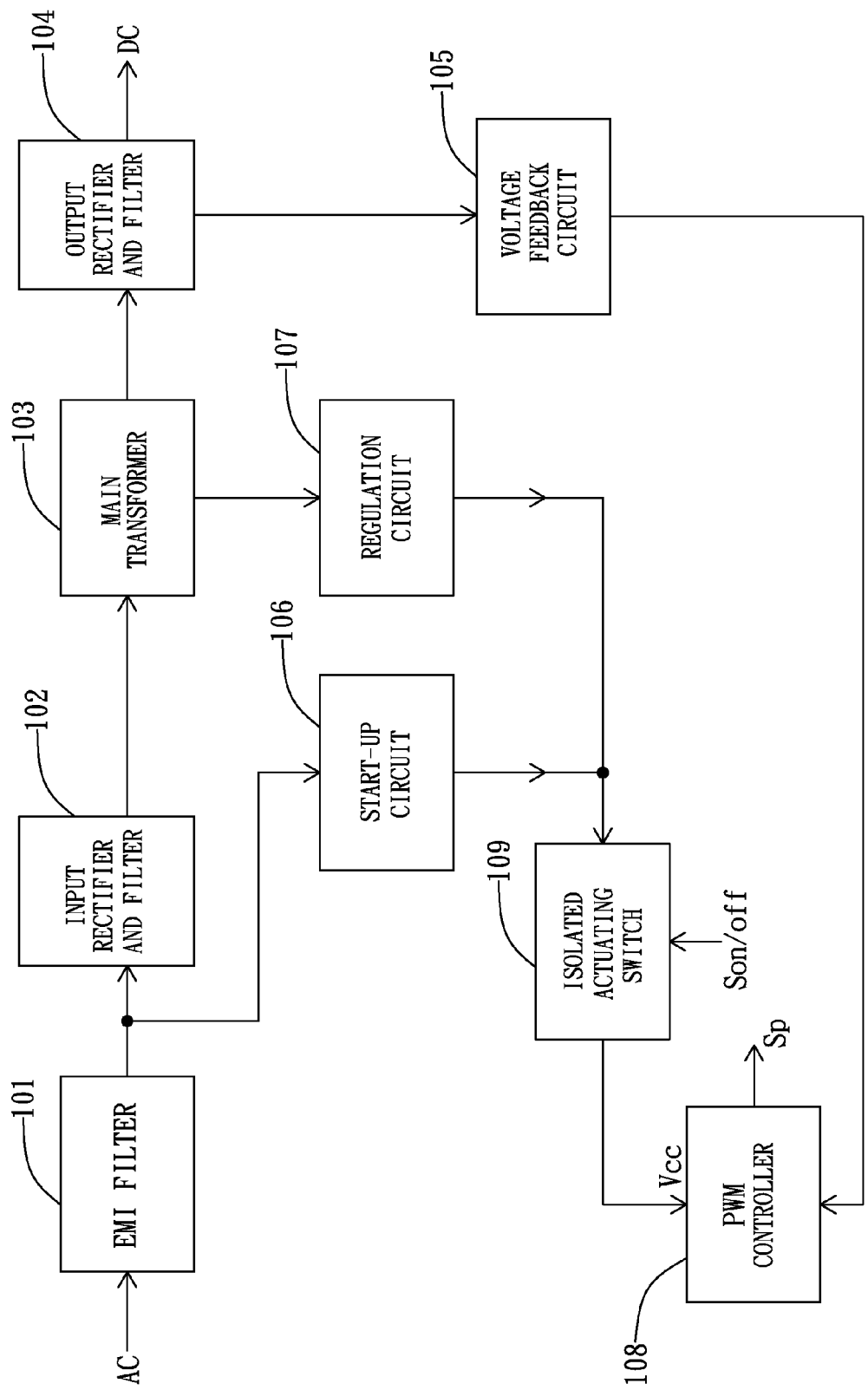
FIG. 1 is the block diagram of a power converter according to a preferred embodiment of the present invention.

Please refer to FIG. 1, which shows the block diagram of a power converter according to a preferred embodiment of the present invention. As shown in FIG. 1, the power converter with extremely low standby power consumption, for converting an input AC power to an output DC power according to the preferred embodiment of the present invention, can operate in a normal conversion mode or a freeze mode. The power converter comprises an EMI filter 101, an input rectifying and filtering unit 102, a main transformer 103, an output rectifying and filtering unit 104, a voltage feedback circuit 105, a start-up circuit 106, a voltage regulating circuit 107, a PWM controller 108, and an isolated actuating switch 109.

In FIG. 1, the EMI filter 101 is placed between the input AC power and the input rectifying and filtering unit 102 to filter out possible EMI (Electro Magnetic Interference) generated in the power converter.

The input rectifying and filtering unit 102 is coupled to the input AC power through the EMI filter 101 to perform rectifying and filtering operation on the input AC power to provide a first ripple voltage.

The main transformer 103 is for generating a second voltage and a third voltage according to the first ripple voltage.

The output rectifying and filtering unit 104 is used to generate the output DC power according to the second voltage.

The voltage feedback circuit 105 is coupled to the output rectifying and filtering unit 104 to provide a feedback voltage for the PWM controller 108.

The start-up circuit 106 is used to provide a start-up current to assist in generating the DC supply voltage.

The voltage regulating circuit 107 is used to generate the DC supply voltage according to the third voltage.

The PWM controller 108 has a $V_{CC}$ contact pin, in which when the $V_{CC}$ contact pin is supplied with the DC supply voltage, a pulse width modulation signal $S_P$ is generated according to the feedback voltage of the output DC power to conduct the normal conversion mode; when the $V_{CC}$ contact pin is isolated from the DC supply voltage, the power converter will be in the freeze mode and present a standby state.

The isolated actuating switch 109 has a control side and a channel side, in which one terminal of the channel side is coupled to the DC supply voltage, the other terminal of the channel side is coupled to the $V_{CC}$ contact pin of the PWM controller 108, and the control side is coupled to a switch signal $S_{on/off}$ of a loading device (not shown in FIG. 1). The conduction of the channel side is under the control of the switch signal $S_{on/off}$. Besides, the loading device can be any portable electronic equipment such as a notebook PC, an electronic book, etc.

Figure 2:
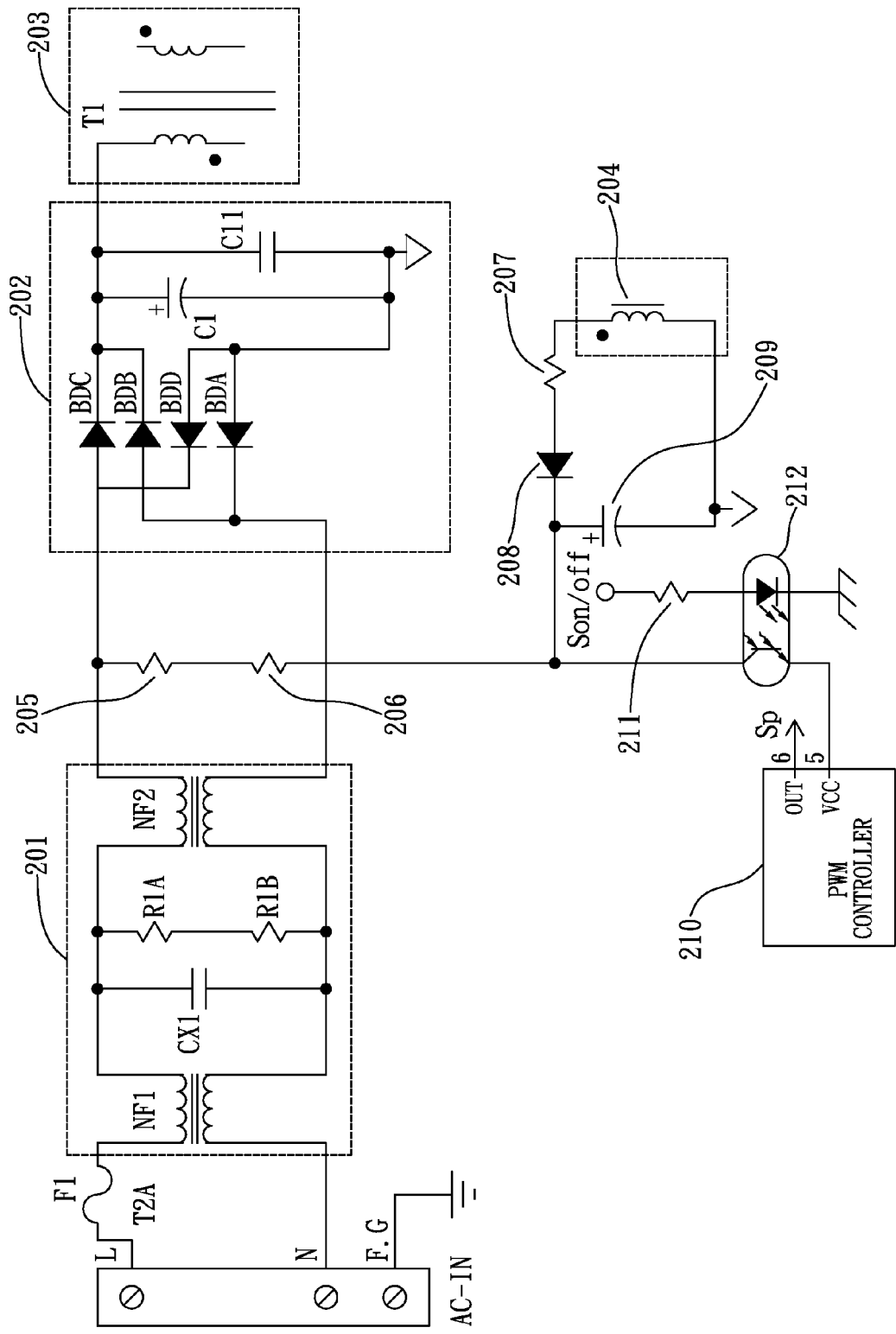
FIG. 2 is the circuit diagram of a power converter according to a preferred embodiment of the present invention (excluding the output rectifying and filtering unit and the voltage feedback circuit).

Please refer to FIG. 2, which shows the circuit diagram of a power converter according to a preferred embodiment of the present invention (excluding the output rectifying and filtering unit and the voltage feedback circuit). As shown in FIG. 2, the power converter with extremely low standby power consumption, for converting an input AC power to an output DC power according to the preferred embodiment of the present invention, comprises an EMI filter 201, an input rectifying and filtering unit 202, a main transformer 203, an aux-winding 204, a resistor 205, a resistor 206, a resistor 207, a diode 208, a capacitor 209, a PWM controller 210, a resistor 211 and an photo coupling switch 212.

In FIG. 2, the EMI filter 201 is placed between the input AC power and the input rectifying and filtering unit 202 to filter out possible EMI (Electro Magnetic Interference) generated in the power converter.

The input rectifying and filtering unit 202 is coupled to the input AC power through the EMI filter 201 to perform rectifying and filtering operation on the input AC power to provide a first ripple voltage.

The main transformer 203 is for generating a second voltage according to the first ripple voltage. The second voltage is then converted by an output rectifying and filtering unit (not shown in FIG. 2) to provide the output DC power.

The aux-winding 204 is used to generate a third voltage according to the first ripple voltage.

The resistor 205 and resistor 206 constitute a start-up circuit, used to provide a start-up current to assist in generating a DC supply voltage.

The resistor 207, diode 208 and capacitor 209 constitute a voltage regulating circuit, used to generate the DC supply voltage according to the third voltage.

The PWM controller 210, for example but not limited to LD7532, has a $V_{CC}$ contact pin, in which when the $V_{CC}$ contact pin is supplied with the DC supply voltage, a pulse width modulation signal $S_P$ is generated according to the feedback voltage of the output DC power to conduct the normal conversion mode; when the $V_{CC}$ contact pin is isolated from the DC supply voltage, the power converter will be in the freeze mode and present a standby state.

The resistor 211 and photo coupling switch 212 constitute an isolated actuating switch. The resistor 211 is used to protect the photo coupling switch 212. The photo coupling switch 212 has a control side and a channel side, in which one terminal of the channel side is coupled to the DC supply voltage, the other terminal of the channel side is coupled to the $V_{CC}$ contact pin of the PWM controller 210, and the control side is coupled through the resistor 211 to a switch signal $S_{on/off}$ of a loading device (not shown in FIG. 1). The conduction of the channel side is under the control of the switch signal $S_{on/off}$.

When the switch signal $S_{on/off}$ is at high level, a current will flow through the control side of the photo coupling switch 212 to cause a light emitting diode to emit light, and a photo sensing transistor in the channel side of the photo coupling switch 212 will then be turned on to connect the $V_{CC}$ contact pin of the PWM controller 210 with the DC supply voltage. When the switch signal $S_{on/off}$ is at low level, the light emitting diode is off, and the photo sensing transistor in the channel side of the photo coupling switch 212 is also off to disconnect the $V_{CC}$ contact pin of the PWM controller 210 from the DC supply voltage.

Therefore, through the implementation of the present invention to provide a mechanism for enabling or disabling a PWM controller, a power converter capable of complying with the standby demand is proposed. Besides, the photo coupling switch device is cost effective and only consumes extremely low power, so the present invention does overcome the drawbacks of prior art.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A power converter with extremely low standby power consumption for converting an input AC power to an output DC power, comprising:
    a DC supply voltage generating unit, comprising a voltage regulating circuit, used for generating a DC supply voltage and a start-up circuit, used to provide a start-up current to assist in generating said DC supply voltage;
    a pulse width modulation controller, used for generating a pulse width modulation signal according to a feedback voltage of said output DC power; and
    an isolated actuating switch, placed between said DC supply voltage generating unit and said pulse width modulation controller, for controlling the supply of said DC supply voltage to said pulse width modulation controller, according to a switch signal from a loading device.

2. The power converter according to claim 1, wherein said start-up circuit comprises at least a resistor.

3. The power converter according to claim 2, wherein said voltage regulating circuit comprises a diode and a capacitor.

4. The power converter according to claim 3, wherein said isolated actuating switch comprises a photo coupling switch device.

5. The power converter according to claim 4, further comprises an electro-magnetic interference filter, coupled to said input AC power to filter out the electro-magnetic interference.

6. The power converter according to claim 5, further comprises an input rectifying and filtering unit, coupled to said electro-magnetic interference filter to generate a first voltage.

7. The power converter according to claim 6, further comprises a main transformer, used to generate a second voltage and a third voltage according to said first voltage.

8. The power converter according to claim 7, further comprises an output rectifying and filtering unit, used to generate said output DC power according to said second voltage.

9. The power converter according to claim 8, wherein said voltage regulating circuit is used to generate said DC supply voltage according to said third voltage.

10. The power converter according to claim 9, further comprises a voltage feedback circuit, coupled to said output rectifying and filtering unit to provide said feedback voltage for said pulse width modulation controller.

11. The power converter according to claim 10, wherein said loading device can be any portable electronic equipment.

* * * * *